US012690529B1

(12) United States Patent
Baras

(10) Patent No.: US 12,690,529 B1
(45) Date of Patent: Jul. 28, 2026

(54) IRRIGATION METHOD AND APPARATUS FOR INDOOR FARMING

(71) Applicant: Area 2 Farms, PBC, Washington, DC (US)

(72) Inventor: Tyler Baras, Pacifica, CA (US)

(73) Assignee: Area 2 Farms, PBC, Arlington, VA (US)

( * ) Notice: Subject to any disclaimer, the term of this patent is extended or adjusted under 35 U.S.C. 154(b) by 303 days.

(21) Appl. No.: 18/591,493

(22) Filed: Feb. 29, 2024

Related U.S. Application Data

(63) Continuation-in-part of application No. 17/314,904, filed on May 7, 2021, now Pat. No. 11,974,531.

(51) Int. Cl.
*A01G 25/02* (2006.01)
*A01G 9/24* (2006.01)

(52) U.S. Cl.
CPC .............. *A01G 25/02* (2013.01); *A01G 9/247* (2013.01); *A01G 9/249* (2019.05)

(58) Field of Classification Search
CPC ...... A01G 9/247; A01G 31/025; A01G 31/04; A01G 31/042; A01G 31/043; A01G 31/065; A01G 9/143
See application file for complete search history.

(56) References Cited

U.S. PATENT DOCUMENTS

| | | |
|---|---|---|
| 417,817 A | 12/1889 | Floyd |
| 817,417 A | 4/1906 | Clarke |

| | | |
|---|---|---|
| 2012/0060414 A1 | 3/2012 | Olsson |
| 2015/0282437 A1 | 10/2015 | Ohara |
| 2016/0212946 A1 | 7/2016 | Higgins |
| 2016/0270304 A1 | 9/2016 | Higgins |
| 2018/0359973 A1 | 12/2018 | Millar |
| 2018/0359976 A1* | 12/2018 | Millar .................... A01G 9/085 |

(Continued)

FOREIGN PATENT DOCUMENTS

| | | | | |
|---|---|---|---|---|
| CN | 116138153 A | * | 5/2023 | ........... A01G 31/042 |
| CN | 117397408 A | | 1/2024 | |
| CN | 117581744 A | | 2/2024 | |

(Continued)

OTHER PUBLICATIONS

Monica L. Perry, Notice of Allowance for U.S. Appl. No. 18/602,549 mailed Mar. 27, 2025, 11 pages, US Patent and Trademark Office, Alexandria, Virginia, US.

*Primary Examiner* — Monica L Perry
(74) *Attorney, Agent, or Firm* — Baker Botts L.L.P.

(57) ABSTRACT

Methods and systems for irrigating growth trays in a multi-level farming structure are disclosed. In certain embodiments, a system comprises a conveyor segment an irrigation flow line. The conveyor is configured to move one or more growth trays in a first direction through an irrigation section of the multi-level farming structure. The irrigation flow line may be disposed vertically above the conveyor and extending longitudinally in a second direction substantially perpendicular to the first direction. The irrigation flow line has one or more apertures formed therein that facilitate fluid flowing out of the irrigation flow line onto growth trays being moved through the irrigation section, the one or more apertures spanning multiple points along a length of the irrigation flow line.

19 Claims, 9 Drawing Sheets

(56)    References Cited

U.S. PATENT DOCUMENTS

2019/0307077  A1    10/2019  Lert, Jr.

FOREIGN PATENT DOCUMENTS

| | | | | |
|---|---|---|---|---|
| CN | 117598060 | A | 2/2024 | |
| GB | 922293 | | 3/1963 | |
| KR | 101857213 | B1 * | 5/2018 | ............. A01G 31/02 |
| KR | 20240029013 | A | 3/2024 | |
| KR | 20240029750 | A | 3/2024 | |
| WO | WO-2017210458 | A1 * | 12/2017 | ........... A01G 31/042 |

* cited by examiner

Water Reservoir 514

Growth Trays 502

Roller Conveyor 150

Drainage Device 516

Gutters 512

IRRIGATION METHOD AND APPARATUS FOR INDOOR FARMING

BENEFIT CLAIM

This application claims the benefit under 35 U.S.C. § 120 as a continuation-in-part of application Ser. No. 17/314,904, filed May 7, 2021, the entire contents of which are hereby incorporated by reference for all purposes as if fully set forth herein.

COPYRIGHT NOTICE

TECHNICAL FIELD

One technical field of the present disclosure is irrigation apparatus for indoor farming. Another technical field is apparatus and processes for automation of irrigation for multi-level indoor farming structures.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Indoor vertical farms have been established in many urban and semi-urban locations. Typically, these farms comprise a large number of modular growth trays that serve as carriers for plants, growth media, and sometimes lighting and irrigation apparatus. The trays may be arranged in vertical stacks. In many cases, trays remain in an established vertical position during the entire growth cycle, receiving water, light, and nutrients at a set tray location in a vertical stack. As plants mature and reach harvest, trays are moved vertically to a transport position and then transported horizontally to a harvesting station at which sellable crop products are removed, waste is recycled or discarded, and trays are prepared for another planting cycle. While this approach is workable, it has at least three significant disadvantages.

First, the overall size of the farm is typically large, such as in excess of 10,000 square feet; extensive lateral workspace is necessary to move trays and accommodate transport apparatus.

Second, the use of consistent lighting at all trays of a tall vertical stack tends to cause differential thermal layers to form within the indoor farming space or building. For example, the ambient temperature at the top of a tall vertical stack may be ten degrees higher, or more, than at the bottom of the stack. Consequently, if the same crop is planted in all growth trays of the stack, different trays will experience significantly different growth times and maturation rates depending upon the ideal ambient temperature for the crop. Furthermore, switching the entire room between day and night climates requires a drastic shift in temperature and humidity twice per day, causing ventilation and air conditioning (HVAC) equipment of the building to run too often or too long in an effort to balance the ambient temperature of the interior space. The result is wasted power and the oversizing of HVAC equipment.

Third, in many cases, every tray must have dedicated irrigation plumbing and lighting apparatus to permit irrigation and lighting at all vertical locations of a stack, which contributes to the complexity of the system and increases labor costs. For example, in some vertical farms, a human must use a lift or other equipment to reach the top tray of a vertical stack to enable the disconnection of irrigation lines and electrical supplies before the tray can be moved downward.

These drawbacks become acute when the overall size of an indoor farm becomes smaller. For example, if the total farm size is in the range of 1,000 to 5,000 square feet, then these disadvantages become serious. For vertical farms to proliferate and become more useful to larger populations, there is a need to establish such farms in smaller buildings, such as in retail storefronts located in suburban or urban retail streets or downtown locations. To be physically practical and economically viable, these compact downtown indoor farms need new apparatus and processing techniques.

SUMMARY

The appended claims may serve as a summary of the invention.

DETAILED DESCRIPTION

Figure 1:
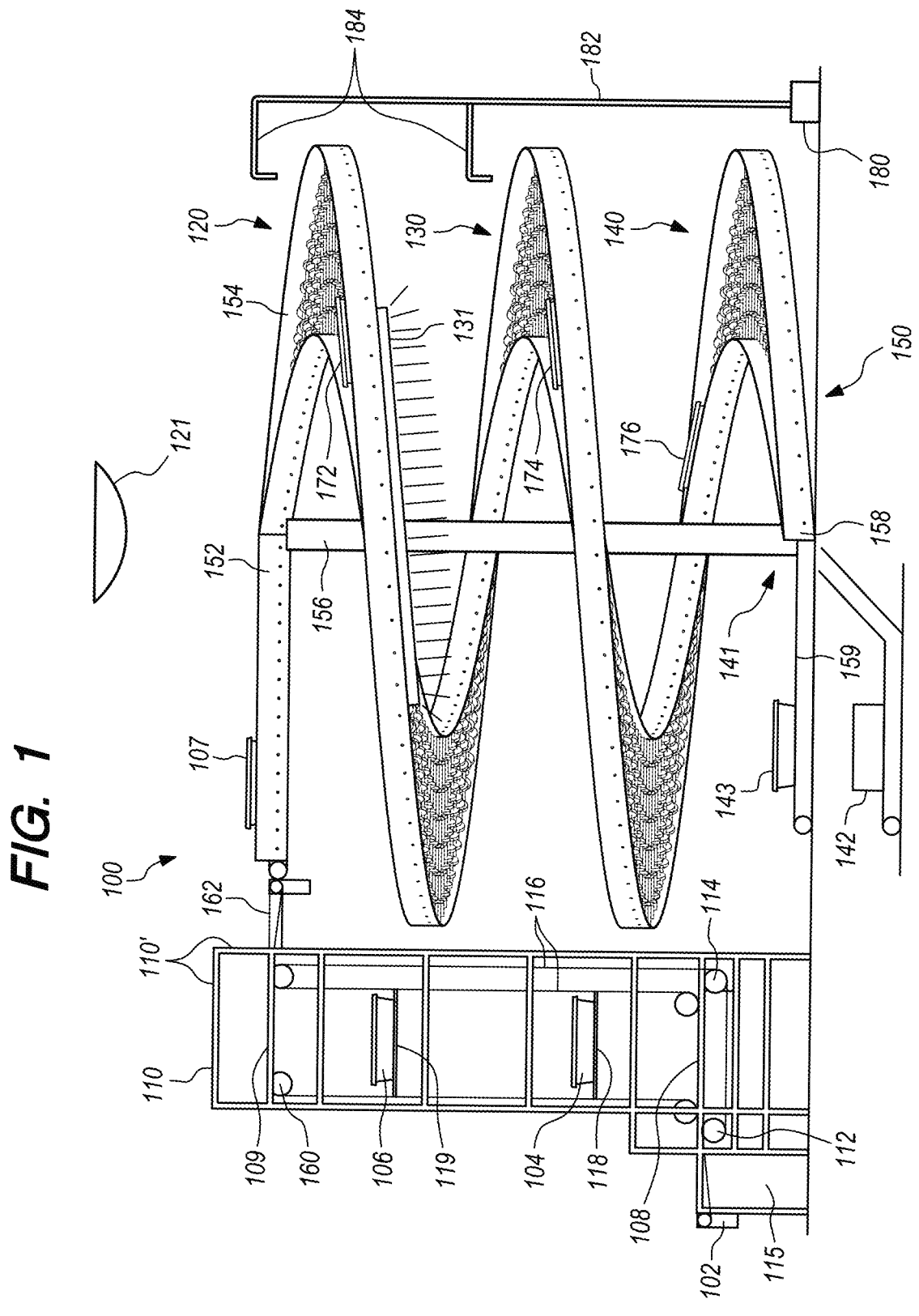
FIG. 1 illustrates an example vertical farming apparatus with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

To the extent that this disclosure describes computer-implemented processes, the text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

In various embodiments, the disclosure encompasses the subject matter of the following numbered clauses:

1. A system for irrigating growth trays in a multi-level farming structure, the system comprising: a conveyor segment to move one or more growth trays in a first direction through an irrigation section of the multi-level farming structure; and an irrigation flow line vertically above the conveyor segment and extending longitudinally in a second direction substantially perpendicular to the first direction, wherein the irrigation flow line has one or more apertures formed therein that facilitate fluid flowing out of the irrigation flow line onto one or more growth trays being moved through the irrigation section, the one or more apertures spanning multiple points along a length of the irrigation flow line.

2. The system of clause 1, wherein the irrigation flow line has multiple holes formed therein at various locations along its length to water plants in the one or more growth trays moving on the conveyor segment.

3. The system of clause 1, wherein each growth tray among the one or more growth trays comprises one or more drain openings having an elongated shape.

4. The system of clause 3, wherein the one or more drain openings are elongated slits extending in a direction parallel to the first direction in which the growth trays are moved along the conveyor segment.

5. The system of clause 3, wherein each particular growth tray among the one or more growth trays comprises two elongated drain openings located equidistant from a center of the particular growth tray.

6. The system of clause 3, further comprising one or more gutters disposed under the conveyor segment and in a position to catch water draining from the one or more drain openings in the one or more growth trays.

7. The system of clause 6, further comprising: a water reservoir to supply water to the irrigation flow line; and one or more drain lines coupled to the one or more gutters to recirculate water caught in the one or more gutters to the water reservoir.

8. The system of clause 1, wherein the irrigation flow line is coupled to a drainage device that recaptures excess water traveling out of the growth trays.

9. A multi-level farming apparatus, comprising: conveying means for conveying growth trays through a plurality of stations, each station located at a different vertical level within the multi-level farming apparatus; and an irrigation means for applying water to the growth trays, the irrigation means being located at one of the plurality of stations through which the growth trays are moved by the conveying means, and the irrigation means comprising an irrigation flow line disposed vertically above the conveying means and extending in a direction substantially perpendicular to the direction of movement of growth trays via the conveying means, wherein the irrigation flow line has one or more apertures formed therein to dispense water.

10. The multi-level farming apparatus of clause 9, wherein the irrigation means is a sole irrigation means of the multi-level farming apparatus.

11. The multi-level farming apparatus of clause 9, wherein the plurality of stations comprise at least one night simulation station and at least one daylight simulation station, wherein the irrigation means is located at a first daylight simulation station following, in the direction of the conveying means, a night simulation station.

12. The multi-level farming apparatus of clause 11, wherein the plurality of stations comprise six daylight simulation stations and two night simulation stations.

13. The multi-level farming apparatus of clause 9, further comprising a loading means for loading growth trays onto the conveying means, the loading means being located at a same station as the irrigation means.

14. A method of irrigating growth trays in a multi-level farming structure, the method comprising: moving one or more growth trays in a first direction through an irrigation section of the multi-level farming structure via a conveyor segment; applying water to the growth trays in the irrigation section via an irrigation flow line disposed vertically above the conveyor segment and extending longitudinally in a second direction substantially perpendicular to the first direction, wherein the irrigation flow line outputs water through one or more apertures spanning multiple points along a length of the irrigation flow line.

15. The method of clause 14, further comprising pausing each particular growth tray on the conveyor segment under the irrigation flow line while applying water to the particular growth tray.

16. The method of clause 14, further comprising moving each particular growth tray continuously on the conveyor segment under the irrigation flow line while applying water to the particular growth tray.

17. The method of clause 14, wherein the irrigation flow line outputs water at a flow rate between approximately 400 gallons per hour and 800 gallons per hour.

18. The method of clause 14, wherein the irrigation flow line outputs water at a flow rate that is higher than a drainage rate for the growth trays.

19. The method of clause 14, further comprising draining excess water through one or more drain openings in the growth trays into one or more gutters.

20. The method of clause 19, further comprising recirculating the excess water collected by the one or more gutters for reuse in the irrigation section.

Embodiments are described in the sections below according to the following outline:

1. General Overview
2. Structural & Functional Overview
3. Implementation Example—Hardware Overview 1. General Overview In some embodiments, the disclosure provides an irrigation method and apparatus designed to apply water to plants in a plurality of growth trays that are in an indoor farming structure. In particular, the irrigation system may be applied for irrigating the plurality of growth trays in a multi-level farming structure. The irrigation system comprises a conveyor segment, such as a roller conveyor, to move the plurality of growth trays in a first direction through an irrigation section of the multi-level farming structure. The multi-level farming structure is configured to create and maintain a proper temperature distribution and humidity levels which will vary by climate, crop type, and the structure for the multi-level farming structure. For example, the irrigation system may be contained in a building or structure with a humidifier or dehumidifier, an air circulation system, or an exhaust ventilation system. Embodiments are independent of the climate directly around and inside the building or structure that contains the multi-level farming structure.

In some embodiments, the irrigation system is configured to use an irrigation flow line to selectively apply water to the plurality of growth trays in the multi-level farming structure. In particular, the irrigation flow line is disposed vertically above the conveyor segment and extends longitudinally in a second direction substantially perpendicular to the first direction. The irrigation flow line has one or more apertures formed therein at various locations that facilitate fluid flowing out of the irrigation flow line onto the plurality of growth trays being moved through the irrigation section. For example, the irrigation flow line is a 1.5 inch in diameter polyvinyl chloride (PVC) water pipe with one or more apertures, such as long slit holes, spanning multiple points along the length of the irrigation flow line to create a curtain of water for the plants in the plurality of growth trays being moved through the irrigation section. Therefore, the irrigation flow line may output water at a flow rate between approximately 400 gallons per hour (GPH) and 800 GPH. The multi-level farming structure is configured to pause each growth tray on the conveyor segment under the irrigation flow line while applying water to the growth tray to ensure the plants in the plurality of growth trays are sufficiently watered.

In some embodiments, the growth trays have one or more drain openings having an elongated shape in the container to allow excess water to travel out of the plurality of growth trays. For example, the drain openings are elongated slits extending in a direction parallel to the first direction in which the plurality of growth trays are moved along the conveyor segment. In particular, each growth tray includes two elongated drain openings located equidistant from the center of the corresponding growth tray. The excess water traveling out of the plurality of growth trays may be collected by one or more drain lines at a drainage rate that is lower than the flow rate of the irrigation flow line. One or more drain lines are coupled to one or more gutters to recirculate water caught in the gutters to a water reservoir. Likewise, the water reservoir water may supply water to the irrigation flow line to apply water to the plants in the plurality of growth trays moved along the conveyor segment. Thus, the irrigation system is configured to maintain a balance of the flow rate and the drainage rate associated with the water flowing in and out of one or more growth trays by controlling the ratio of the flow rate and the drainage rate. The balance is critical to maintain a flood height below a target maximum flood height for the plurality of growth trays and drain the water inside the plurality of growth trays before the next irrigation.

In some embodiments, three or more stations for growth trays are defined at different vertically separated levels of the multi-level farming structure. A first station is at a bottom level, one or more second stations are in an intermediate position, and a third station is at a top level. In an embodiment, all vertical levels between the bottom level and top level are treated similarly and a plurality of second stations may be defined at multiple different vertical levels spaced apart between the bottom level and top level.

In some embodiments, a transport apparatus is configured for transporting growth trays in a multi-level transport structure. The transport apparatus comprises an elevator with a drive mechanism and lift elements to elevate growth trays from a lower-most to an upper-most station. The apparatus further comprises one or more artificial lights to light one or more of the growth trays in one or more of the middle stations and the top stations, and a roller conveyor to convey the trays from the third back to the first station. Finally, the apparatus comprises a control computer coupled to the first station, the transport elevator, and the third station, programmed to move the trays between stations and hold them for certain periods of time.

In some embodiments, the disclosure provides an apparatus for transporting growth trays in a multi-level farming structure, the apparatus comprising transport means for selectively elevating one or more of the growth trays from a first station at a lowest vertical level, through one or more second stations at intermediate higher vertical levels, to a third station at a highest vertical level; means for artificially lighting one or more of the growth trays at one or more of the second stations and for forming thermal layers near the first station, the one or more second stations, and the third station; conveying means for receiving a particular one of the growth trays from the third station and convey the particular one of the growth tray to the first station; control means that is communicatively coupled to the first station, the transport means and the third station, for causing the transport means to transport the growth trays successively from the first station, to the third station, to one or more of the second stations, and then back to the first station through the thermal layers.

2. Structural & Functional Overview

FIG. 1 illustrates an example vertical farming apparatus with which one embodiment could be implemented. In an embodiment, a vertical farming apparatus 100 comprises an elevator 110, powered by a motor 102, configured to lift a plurality of growth trays 104, 106 from a first station 108 to a third station 109. Stations 108, 109 are vertically spaced apart by a distance ranging from a few feet or meters to dozens of feet or meters. Elevator 110 may comprise a plurality of frame members 110' such as steel bars or steel tubes that are affixed via welding or fasteners to form a fixed, rigid frame in which growth trays travel and on which elevator drive elements are mounted or affixed. Elevator 110 may comprise a plurality of drive wheels and idler wheels 112, 114 that are mechanically coupled to motor 102 via one or more continuous belts 116 affixed to lifting surfaces 118, 119 to form a continuously operable lift mechanism capable of lifting trays 104, 106 when empty or when fully loaded with growth medium, seeds, plants, and water embedded in the growth medium or in a part of the tray. The foregoing elements may comprise one example of transport means for selectively elevating one or more of the growth trays from a first station at the lowest vertical level through one or more second stations at intermediate higher vertical levels to a third station at the highest vertical level. The specific structure of elevator 110 and the other elements of this paragraph are not required and vertical actuators, hydraulics, or other lifting or elevating apparatus may be used in other embodiments as the transport means.

In an embodiment, the apparatus comprises control means that is communicatively coupled to the first station, the transport means, and the third station, for causing the transport means to transport the growth trays successively from the first station to the third station to one or more of the second stations, and then back to the first station through the thermal layers. For example, elevator 110 further comprises a processor housing 115, usually near motor 102, comprising a control computer that may drive the operation of the elevator under stored program control. The control computer, which is further described in other sections herein, may incorporate wireless networking communication interfaces to deliver a graphical user interface or other user interface to a compatible browser, application, or app of a mobile computing device, and to receive input signals and commands relating to elevator action from the mobile device.

The third station 109 is associated with the uppermost lifting position of elevator 110. In an embodiment, third station 109 may comprise a horizontal discharge mechanism 160 that is configured to drive a growth tray 107 laterally away from or out of the third station to an exit assembly 162 that is adjacent to a horizontal receiving segment 152 of conveying means for receiving a particular one of the growth trays from the third station and convey the particular one of the growth tray to the first station, such as a roller conveyor 150. Motor 102 may drive the horizontal discharge mechanism 160 via a dedicated set of belts and pulleys, gears, or wheels, or the horizontal discharge mechanism may operate using solenoids, air-driven actuators, or other electro-mechanical means under the control of the control computer to drive the growth tray laterally away from or out of the third station to the exit assembly. In an embodiment, the horizontal discharge mechanism 160 is structured to drive a growth tray laterally with sufficient force to induce momentum to impel the growth tray 107 laterally along the horizontal receiving segment 152 of roller conveyor 150.

In an embodiment, the horizontal receiving segment 152 of roller conveyor 150 is affixed to a plurality of downwardly directed arcuate roller conveyor segments 154, which are coupled end-to-end to form a spiral conveyor structure. Segments of roller conveyor 150 may be affixed to a central post 156 or other frame members (not shown for clarity) to maintain a rigid spiral structure. The spiral conveyor structure is configured to transfer, by force of gravity, growth trays 107, 172, 174, 176 downwardly from an uppermost third station 120 to a second station 130 and first station 140, terminating or arriving at an end segment 158 coupled to a Y-switch junction 141.

For purposes of illustrating a clear example, FIG. 1 shows a roller conveyor having a sparse set of growth trays 107, 172, 174, 176, 143 in different positions on the conveyor; in practice, embodiments may accommodate a large number of growth trays positioned adjacent to one another, and not spaced apart, fully occupying all segments of the roller conveyor. In this manner, growth trays are held on the roller conveyor for relatively long periods of time while plant growth occurs in the trays. Movement of trays along the roller conveyor is induced by gravity when the last tray 143 is removed from the apparatus or moved from the end segment 158 to an end station 159 to the elevator, a harvesting station, or an irrigation station.

In an embodiment, the apparatus comprises means for artificially lighting one or more of the growth trays at one or more of the second stations and for forming thermal layers near the first station, the one or more second stations, and the third station. In an embodiment, trays on the third station 120 may be illuminated by natural light cast on the apparatus via a skylight, windows, or other aperture in a structure that contains the apparatus or lit by one or more artificial lights 121. In an embodiment, growth trays 107, 172, 174, 176, 143 slide from the uppermost, third station 120 down the roller conveyor 150 to the second station 130 after a certain time interval. In an embodiment, the second stations are lit by one or more artificial lights 131. Artificial lighting is preferred in this location because one or more parts of the second station may be shadowed by the upper elements of the roller conveyor 150. For one or more artificial lights, light-emitting diode (LED), halogen, fluorescent fixtures, grow lights, or other light fixtures may be used, coupled to power supplies or line voltage via one or more adapters, transformers, dimmers, or controllers.

After another time interval, growth trays 107, 172, 174, 176, 143 are then moved from the second station 130 to the first station 140. In an embodiment, the first station 140 represents a lower-most position at or near ground level and/or otherwise convenient for manual attention by staff. At the first station 140, the growth trays may arrive at an end station 159 of the roller conveyor 150 and transfer via Y-switch junction 141 to one or more irrigation stations 142 at which water is applied to the trays. Alternatively, irrigation station 142 may comprise all of the first station 140 such that all the crops on the first station 140 are watered at once. In some embodiments, the apparatus may comprise multi-level irrigation apparatus 180 comprising an elongated vertical standpipe 182 coupled to one or more nozzles or sprayers 184 that are positioned to selectively apply water to trays in or near one or more of stations 120, 130.

In an embodiment, when it is time for a particular crop to be harvested, either before or after being irrigated, the growth trays 107, 172, 174, 176, 143 may traverse the Y-switch junction 141 to be moved towards a harvester instead of, alongside, or at the same location as the irrigation station 142.

In an embodiment, roller conveyor 150 comprises a skate wheel roller conveyor. The apparatus, as described herein for FIG. 1, facilitates the continuous or periodic movement of the growth trays 107, 172, 174, 176, 143 from upper, illuminated, and warmer vertical stations to lower, darker, cooler stations. Therefore, the apparatus can be controlled to periodically move the growth trays 107, 172, 174, 176, 143 through an artificial 24-hour day-night cycle in which plants are exposed to natural or artificial lighting in upper stations for a first period, then moved downwardly over time to middle stations with less light, then moved to lower-most stations with little or no light. Movement processes, timing, irrigation, and other processes are further described in other sections herein.

Figure 2:
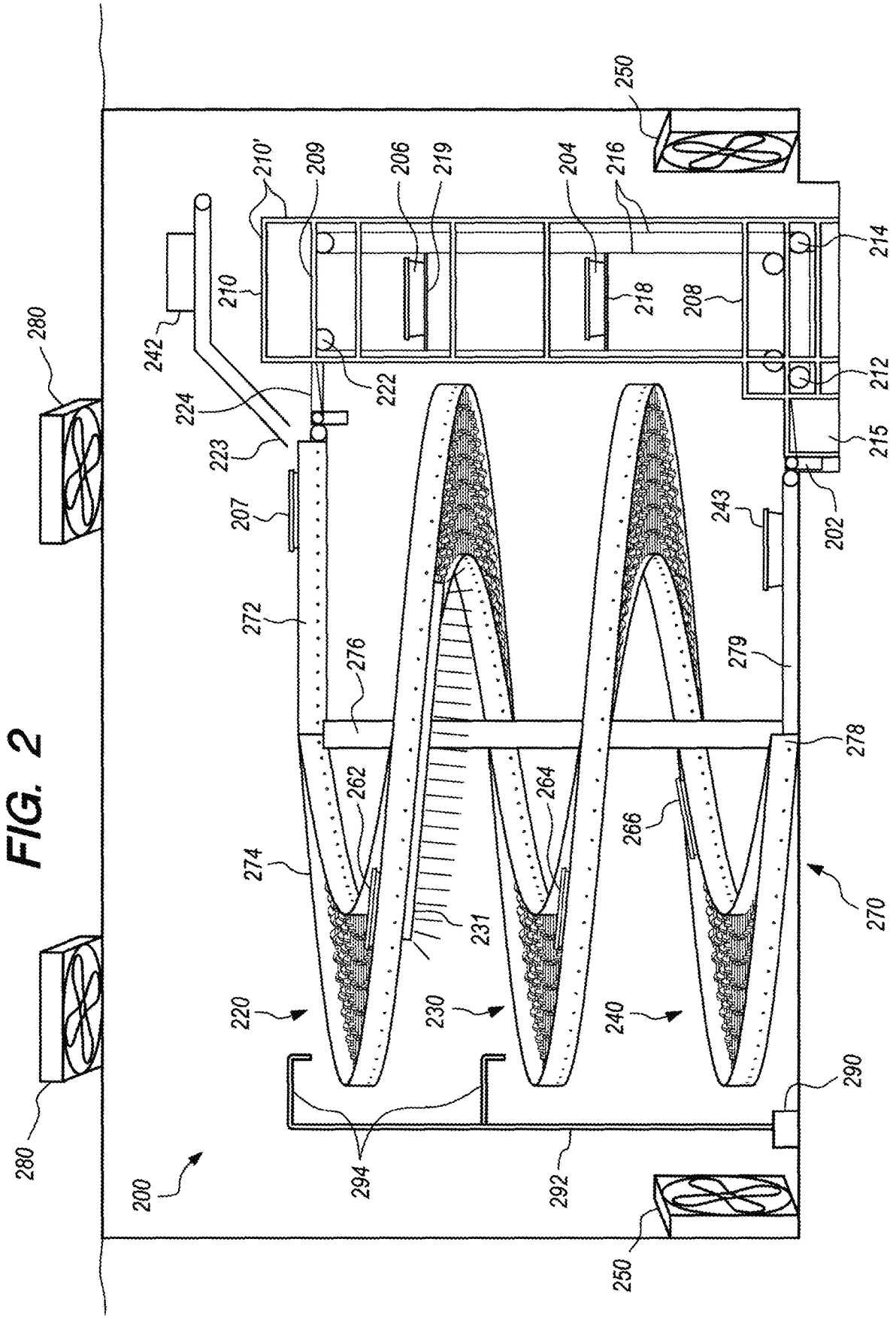
FIG. 2 illustrates an example vertical farming apparatus with which one embodiment could be implemented.

FIG. 2 illustrates an example vertical farming apparatus with which one embodiment could be implemented.

In the embodiment of FIG. 2, apparatus 200 comprises a main floor at the top or third station 220 rather than a bottom or first station 240. The main floor in FIG. 2 is at or near ground level or floor level and/or otherwise convenient for manual attention by staff. It may, for example, be on the first floor of a building. The lower stations may be in a cavity. A plurality of growth trays 204, 206 are transported from the first station 240 to the third station 220 by an elevator 210, powered by a motor 202. Stations 208, 209 are vertically spaced apart by a distance ranging from a few feet or meters to dozens of feet or meters.

Elevator 210 may comprise a plurality of frame members 210' such as aluminum or steel bars or tubes affixed via welding or fasteners to form a fixed, rigid frame in which growth trays travel and on which elevator drive elements are mounted or affixed. Elevator 210 may comprise a plurality of drive wheels and idler wheels 212, 214 that are mechanically coupled to motor 202 via one or more continuous belts 216 affixed to lifting surfaces 218, 219 to form a continuously operable lift mechanism capable of lifting trays 204, 206 when empty or when fully loaded with growth medium, seeds, plants, and water embedded in the growth medium or in a part of the tray.

In an embodiment, elevator 210 further comprises a processor housing 215, usually near motor 202, comprising a control computer that may drive the operation of the elevator under stored program control. The control computer, which is further described in other sections herein, may incorporate wireless networking communication interfaces to deliver a graphical user interface or other user interface to a compatible browser, application, or app of a mobile computing device, and to receive input signals and commands relating to elevator action from the mobile device.

The third station 209 is associated with the uppermost lifting position of elevator 210. In an embodiment, third station 209 may comprise a horizontal discharge mechanism 222 that is configured to drive a growth tray 207 laterally away from or out of the third station to an exit assembly 224 that is adjacent to a horizontal receiving segment 272 of a roller conveyor 270. Motor 202 may drive the horizontal discharge mechanism 222 via a dedicated set of belts and pulleys, gears, or wheels, or the horizontal discharge medium may operate using solenoids, air-driven actuators, or other electro-mechanical means under the control of the control computer to drive the growth tray laterally away from or out of the third station to the exit assembly. In an embodiment, the horizontal discharge mechanism 222 is structured to drive a growth tray laterally with sufficient force to induce momentum to impel a growth tray 207 laterally along the horizontal receiving segment 272 of roller conveyor 270.

In an embodiment, harvesting station 242 is horizontal to the third station (shown above in FIG. 2 for clarity). The harvesting station may comprise a location of the conveyor to which trays are directed for harvesting manually or using a harvesting device, apparatus, or robot. The harvesting device may harvest the crops as the trays pass from elevator 210 to the horizontal receiving segment 272. Alternatively, trays ready for harvesting may be diverted by means of a Y-junction 223 to another track with the harvesting station 242 or harvester. In the case of diversion to another track, the trays are replaced with the same or another tray so as to keep the trays close together to push each other along the roller conveyor.

In an embodiment, the horizontal receiving segment 272 of roller conveyor 270 is affixed to a plurality of downwardly directed arcuate roller conveyor segments 274, which are coupled end-to-end to form a spiral conveyor structure. Segments of roller conveyor 270 may be affixed to a central post 276 or other frame members to maintain a rigid spiral structure. The spiral conveyor structure is configured to transfer, by force of gravity, growth trays 207, 262, 264, 266 downwardly from an uppermost third station 220 to a second station 230 and first station 240.

For purposes of illustrating a clear example, FIG. 2 shows a roller conveyor having a sparse set of growth trays 207, 262, 264, 266, 243 in different positions on the conveyor; in practice, embodiments may accommodate a large number of growth trays positioned adjacent to one another, and not spaced apart, fully occupying all segments of the roller conveyor. In this manner, growth trays are held on the roller conveyor for relatively long periods of time while plant growth occurs in the trays. Movement of trays along the roller conveyor is induced by gravity when the last tray 243 is removed from the apparatus or enters elevator 210 to be moved from the first station 208 to the third station 209 again.

In some embodiments, only the third station 220 may be above ground level to use natural geothermal cooling at the lower stations. The first station 240 and the second station 230 may be in a cavity, which may be underground. The growth trays at the third station may be illuminated by natural light cast on the apparatus via a skylight, windows, or other aperture in a structure that contains the apparatus or lit by one or more artificial lights, not shown in FIG. 2. In an embodiment, growth trays 207, 262, 264, 266 slide from the uppermost, third station 220 down the roller conveyor 270 to the second station 230 after a certain time interval.

In an embodiment, any second station is lit by one or more artificial lights 231. Artificial lighting is preferred in this location because one or more parts of the second station may be shadowed by the upper elements of the roller conveyor 270. These lights may be attached to the bottom of the roller conveyor segments for the stations directly above the stations receiving the light. For artificial lighting, light-emitting diode (LED), halogen, grow lights, fluorescent fixtures, or other light fixtures may be used, coupled to power supplies or line voltage via one or more adapters, transformers, dimmers, or controllers.

The growth trays may also be irrigated at an irrigation station (not shown) at the third station 220. In an embodiment, the irrigation station may be at one spot on the third station 220. Alternatively, the irrigation station may comprise all of the third station 220. The fact that the third station is at ground level allows for case of working and fixing any problems with the irrigation system and its plumbing. In other embodiments, as shown in FIG. 2, the apparatus may comprise multi-level irrigation apparatus 290 comprising an elongated vertical standpipe 292 coupled to one or more nozzles or sprayers 294 that are positioned to selectively apply water to trays in or near one or more stations.

In an embodiment, when it is time for a particular crop to be harvested, either done manually with or without a schedule or done according to a programmed schedule, they are diverted by the y-junction 223 to a harvest station. In an embodiment, the crops are harvested after returning up the elevator from a simulated night period. In another embodiment, the crops are harvested after a simulated day period. On cycles, where a crop is not ready for harvesting, the growth trays 207 are moved directly from the horizontal discharge mechanism 222 to the horizontal receiving segment 272.

In an embodiment, at a given time interval, the growth trays 207 at the third station 220 slide to the second station 230. At another given time interval, growth trays 264 at the second station 230 are moved to the first station 240. In an embodiment, the first station 240 represents a lower-most position below ground level. The growth trays on the first station 240 sliding past an end segment 278 and an end station 279 into elevator 210, makes room for the growth trays on the other station to slide down by the force of gravity. In an embodiment, roller conveyor 270 comprises a skate wheel roller conveyor. Apparatus as described herein for FIG. 2 facilitates the continuous or periodic movement of the growth trays 207, 262, 264, 266, 243 from upper, illuminated, and warmer vertical stations to lower, darker, cooler stations. Therefore, the apparatus can be controlled to periodically move the growth trays 207, 262, 264, 266, 243 through an artificial 24-hour day-night cycle in which plants are exposed to natural or artificial lighting in upper stations for a first period, then moved downwardly over time to middle stations with less light, then moved to lower-most stations with little or no light.

In some embodiments, ambient air is pulled into the first station 240 by means of one or more fans 250. The air to this fan comes from ambient air above the third station 220 through a duct. Exhaust fans 280 may also be placed above the third station to pull air out of the structure. These fans may be replaced by any other type of air blower that may serve the same purpose.

Figure 3:
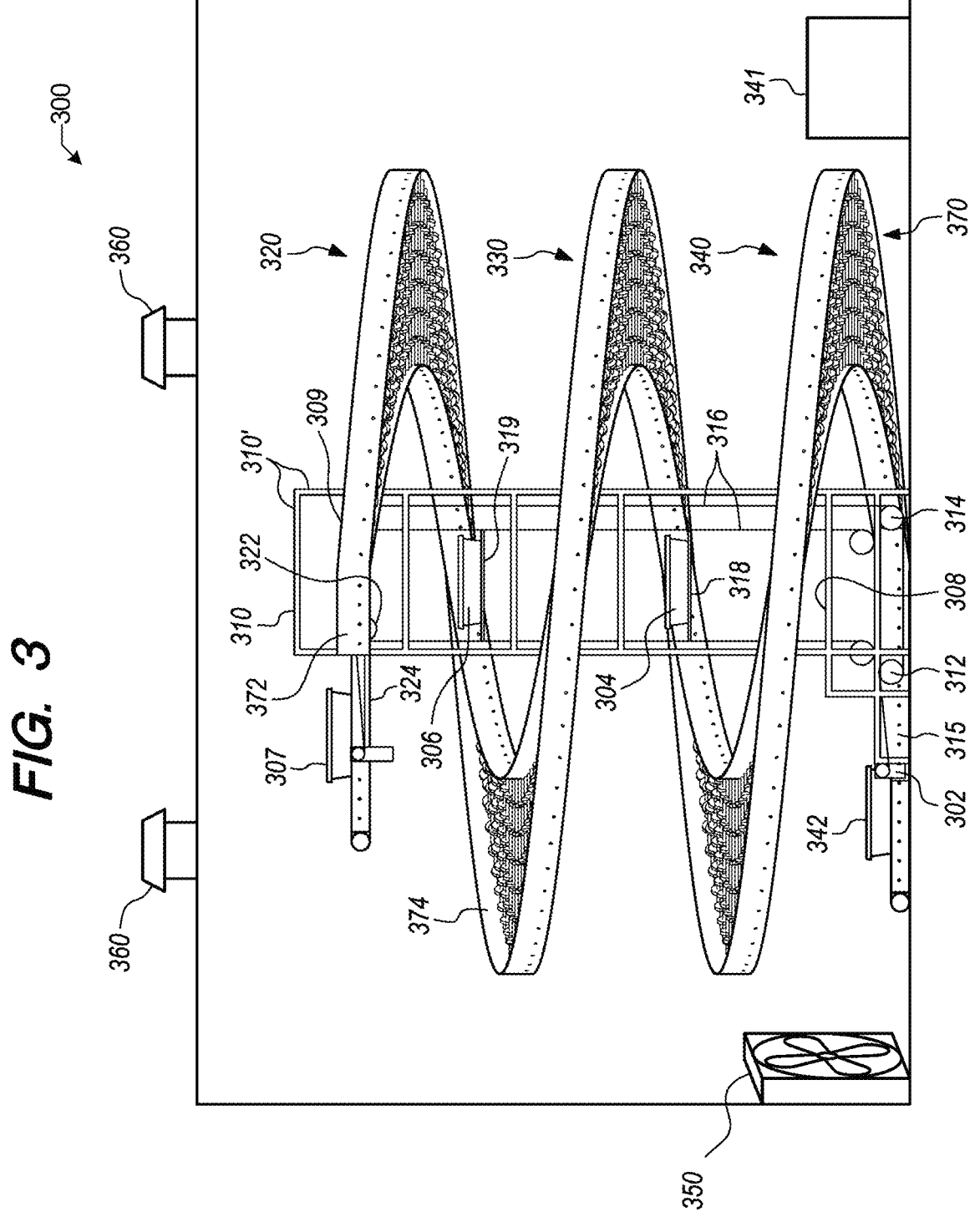
FIG. 3 illustrates an example vertical farming apparatus with which one embodiment could be implemented.

FIG. 3 illustrates an example vertical farming apparatus with which one embodiment could be implemented.

In the embodiment of FIG. 3, apparatus 300 comprises a main floor at ground level or floor level. From the main floor, a plurality of growth trays 304, 306 are transported from first station 308 to a third station 309 by an elevator 310 concentric to the stations, powered by a motor 302. Stations 308 and 309 are vertically spaced apart by a distance ranging from a few feet or meters to dozens of feet or meters.

Elevator 310 may comprise a plurality of frame members 310' such as steel bar or steel tubes that are affixed via welding or fasteners to form a fixed, rigid frame in which growth trays 304, 306 travel and on which elevator drive elements are mounted or affixed. Elevator 310 may comprise a plurality of drive wheels and idler wheels 312, 314 that are mechanically coupled to motor 302 via one or more continuous belts 316 affixed to lifting surface 318, 319 to form a continuously operable lift mechanism capable of lifting trays 304, 306 when empty or when fully loaded with growth medium, seeds, plants, and water embedded in the growth medium or in a part of the tray.

In an embodiment, the apparatus is a tower structure with a 12-foot (3.66 m) diameter and a growing spiral with a 10-foot (3 m) diameter. The roller conveyor may be a gravity roller track with a 24-inch to 30-inch (60 cm to 76 cm) width to fit a 24-inch long by 12-inch (60 cm by 30 cm) wide growing container. The spiral may drop 6 inches (15 cm) in a quarter rotation, creating a 24-inch (60 cm) space between levels. The height of the tower can range from eight feet to 24 feet (2.4 m to 7.3 m) or even more. In an embodiment, the height of the structure is at least 6 feet (1.83 m), as this is the minimum height that may obtain the benefits of convection. At this height, the effects of temperature stratification and air flow are able to be utilized by the system.

In an embodiment, the humidity surrounding the structure is 40-80%. To get this, an evaporative cooler may be used in dry climates, while a dehumidifier may be used in humid climates. In an embodiment, the tower has an intake fan 350 coupled to a swamp cooler (wet wall) and an insect screen at a base to push in cool, humid air. In an embodiment, the tower operates with positive pressure, helping minimize the intrusion of insects or pathogens through any potential gaps in the tower structure. The cool, humid air pushed into the first station 340 rises upward and warms as it passes the one or more artificial lights over the second station 330 and the lights that shine on the third station 320. The warm air escapes through vents 360 on the top of the tower.

In an embodiment, elevator 310 sits concentric to a spiral roller conveyor 370. Elevator 310 further comprises a processor housing 315, usually near motor 302, comprising a control computer that may drive the operation of the elevator under stored program control. The control computer may incorporate wireless networking communication interfaces to deliver a graphical user interface or other user interface to a compatible browser, application, or app of a mobile computing device, and to receive input signals and commands relating to elevator action from the mobile device. Elevator 310 lifts the growth trays 304, 306 from first station 308 to a third station 309.

The third station 309 is associated with the uppermost lifting position of elevator 310. In an embodiment, third station 309 may comprise a horizontal discharge mechanism 322 that is configured to drive a growth tray 307 laterally away from or out of the third station to an exit assembly 324 that is adjacent to a horizontal receiving segment 372 of a roller conveyor 370. Motor 202 may drive the horizontal discharge mechanism 322 via a dedicated set of belts and pulleys, gears, or wheels, or the horizontal discharge medium may operate using solenoids, air-driven actuators, or other electro-mechanical means under the control of the control computer to drive the growth tray laterally away from or out of the third station to the exit assembly. In an embodiment, the horizontal discharge mechanism 322 is structured to drive a growth tray laterally with sufficient force to induce momentum to impel a growth tray 307 laterally along the horizontal receiving segment 372 of roller conveyor 370. In an embodiment, the horizontal receiving segment 372 of roller conveyor 370 is affixed to a plurality of downwardly directed arcuate roller conveyor segments 374, which are coupled end-to-end to form a spiral conveyor structure around the elevator. Segments of roller conveyor 370 may be affixed to a frame of elevator 310 or other frame members to maintain a rigid spiral structure. The spiral conveyor structure is configured to transfer, by force of gravity, growth trays 307, 342 downwardly from an uppermost third station 320 to a second station 330 and first station 340.

For purposes of illustrating a clear example, FIG. 3 shows the roller conveyor having a sparse set of growth trays 307, 342 in different positions on the conveyor; in practice, embodiments may accommodate a large number of growth trays positioned adjacent to one another and not spaced apart, fully occupying all segments of the roller conveyor. In this manner, growth trays are held on the roller conveyor for relatively long periods of time while plant growth occurs in the trays. Movement of trays along the roller conveyor is induced by gravity when the last tray 342 is removed from the apparatus or moved from an end station to a harvesting station or irrigation station.

In some embodiments, the growth tray 307 at the third station may be illuminated by natural light cast on the apparatus or lit by one or more artificial lights. Some embodiments may have an option for both at different times, with a timer set for turning the lights on. In an embodiment, growth trays 307, 342 slide from the uppermost third station 320 down the roller conveyor 370 to the second station 330 after a specified time interval. There may be any number of second station 330 between the first station 340 and the third station 320. In an embodiment, the second station 330 is lit by one or more artificial lights. Artificial lighting is preferred in this location because one or more parts of the second station may be shadowed by the upper elements of the roller conveyor 370. For artificial lighting, light-emitting diode (LED), halogen, fluorescent fixtures, grow lights, or other light fixtures may be used coupled to power supplies or line voltage via one or more adapters, transformers, dimmers, or controllers.

At the next specified interval, the growth trays 304, 306, 307, 342 at the second station 330 slide down to the next level of the second station 330 until the interval comes where they move down to the first station 340. The first station 340 may be at ground level and or in a position where staff has easy access to working with the crops in the growth trays.

In an embodiment, at the first station 340, the growth trays are irrigated from a reservoir 341 adjacent to the first station. This reservoir may be connected to a plumbing system that sprays water onto crops as they pass by a specific spot. Alternatively, the plumbing system may be configured to water all the crops positioned at the first station simultaneously.

Air is blown onto the first station 340 by means of a fan 350. In some embodiments, the air from the fan may first be cooled by an evaporative cooler. The air exhaust is through vents 360 above the third station 320.

Figure 4:
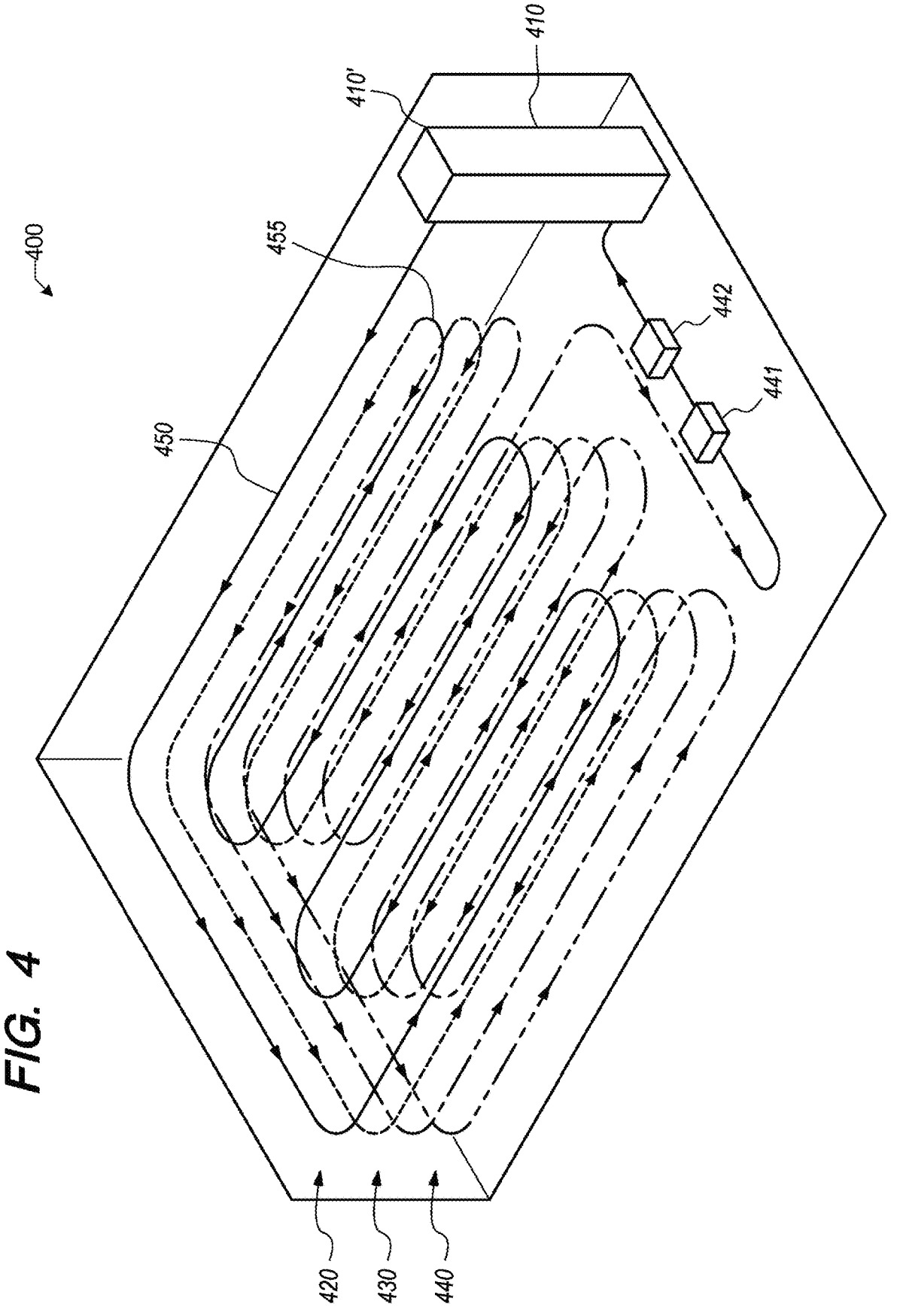
FIG. 4 illustrates an example vertical farming apparatus with which one embodiment could be implemented.

FIG. 4 illustrates an example vertical farming apparatus with which one embodiment could be implemented. In the embodiment of FIG. 4, apparatus 400 is structured to maximize the use of the space within a small warehouse so far as the number of growth trays that can be accommodated. In an embodiment, the apparatus comprises four stations, the middle two stations being the second stations. Apparatus 400 comprises an elevator 410 or lift that moves growth trays from a first station 440 at ground level to a third station 420 at the top of the apparatus. The growth trays on each station are on straight roller conveyor segments 450 which are horizontally parallel to each other with arcuate segments 455 at the end of each stretch of straight roller conveyor segments 450, connecting the parallel straight segments 450. In some embodiments, the effect is like that of a switchback with a gentle decline. In an embodiment, the apparatus has a 25-foot by 30-foot (7.3 m by 9.1 m) footprint and stands 20 feet (6.1 m) high. In an embodiment, the four stations are made up of the combination of straight and arcuate roller conveyor segments 450, 455, with each station alternately reversing the direction of lateral segments, or zig-zagging back and forth, as it stretches from one end of a room to the other. In some embodiments, the stretches of the roller conveyor may be arranged such that they are always at a slightly downward slope so as to utilize the effects of gravity. Each parallel stretch of straight roller conveyor segments 450 may be a few feet or meters long for tight spaces or several hundred feet or meters long for a small to mid-sized warehouse. The apparatus may be held up using a plurality of support beams at each rounded corner or along the sides of the stations. These support beams may be made of metal such as steel and held together by welding or other fasteners.

In an embodiment, apparatus 400 comprises a main floor at ground level. Here, multiple growth trays are transported from a first station 440 to a third station 420 by an elevator 410, powered by a motor. Stations 440, 420 are vertically spaced apart by a distance ranging from a few feet or meters to dozens of feet or meters. Elevator 410 may comprise a plurality of frame members 410' such as aluminum or steel bar or tube affixed via welding or fasteners to form a fixed, rigid frame in which growth trays travel and on which elevator drive elements are mounted or affixed. Elevator 410 may comprise a plurality of drive wheels and idler wheels that are mechanically coupled to a motor via one or more continuous belts affixed to the lifting surface to form a continuously operable lift mechanism capable of lifting growth trays when empty or when fully loaded with growth medium, seeds, plants, and water embedded in the growth medium or in a part of the tray.

In an embodiment, elevator 410 is adjacent to the stations. Elevator 410 further comprises a processor housing, usually near the motor, comprising a control computer that may drive the operation of the elevator under stored program control. The control computer may incorporate wireless networking communication interfaces to deliver a graphical user interface or other user interface to a compatible browser, application, or app of a mobile computing device, and to receive input signals and commands relating to elevator action from the mobile device. Elevator 410 lifts the growth trays from a first station 440 to a third station 420.

The third station 420 is associated with the uppermost lifting position of the elevator 410. In an embodiment, third station 420 may comprise a horizontal discharge mechanism that is configured to drive a growth tray laterally away from or out of the third station to an exit assembly that is adjacent to a horizontal receiving segment of a roller conveyor. The motor may drive the horizontal discharge mechanism via a dedicated set of belts and pulleys, gears, or wheels, or the horizontal discharge medium may operate using solenoids, air-driven actuators, or other electro-mechanical means, under the control of the control computer, to drive the growth tray laterally away from or out of the third station to the exit assembly. In an embodiment, the horizontal discharge mechanism is structured to drive a growth tray laterally with sufficient force to induce momentum to impel a growth tray laterally along the horizontal receiving segment of the roller conveyor.

At a specified interval, the growth trays on the third station 420 slide along a roller conveyor segments 450 to a second station 430. At a second specified time interval, the growth trays on the second station slide down to the first station 440 as all the trays move. At the first station, the growth trays go through a harvesting station 441 for the crops to be harvested at the proper time, either manually or using a mechanical harvester, and then through to an irrigation station 442, where the crops are watered. When the growth trays are moved off of the first station 440 back onto the elevator 410, room is made for all the other growth trays to slide down to the next vertical stations.

In some embodiments, the growth trays at the third station may be illuminated by natural light cast on the apparatus or lit by one or more artificial lights. Some embodiments may have an option for both at different times, with a timer set for turning the lights on. In an embodiment, growth trays slide from the uppermost third station 420 down the roller conveyor to the second station(s) 430 after a specified time interval. There may be any number of second stations 430 between the first station 440 and the third station 420. In an embodiment, the second station 430 is lit by one or more artificial lights. Artificial lighting is preferred in this location because one or more parts of the second station may be shadowed by the upper elements of the roller conveyor. For artificial lighting, light-emitting diode (LED), halogen, fluorescent fixtures, grow lights, or other light fixtures may be used, coupled to power supplies or line voltage via one or more adapters, transformers, dimmers, or controllers.

Figure 5A:
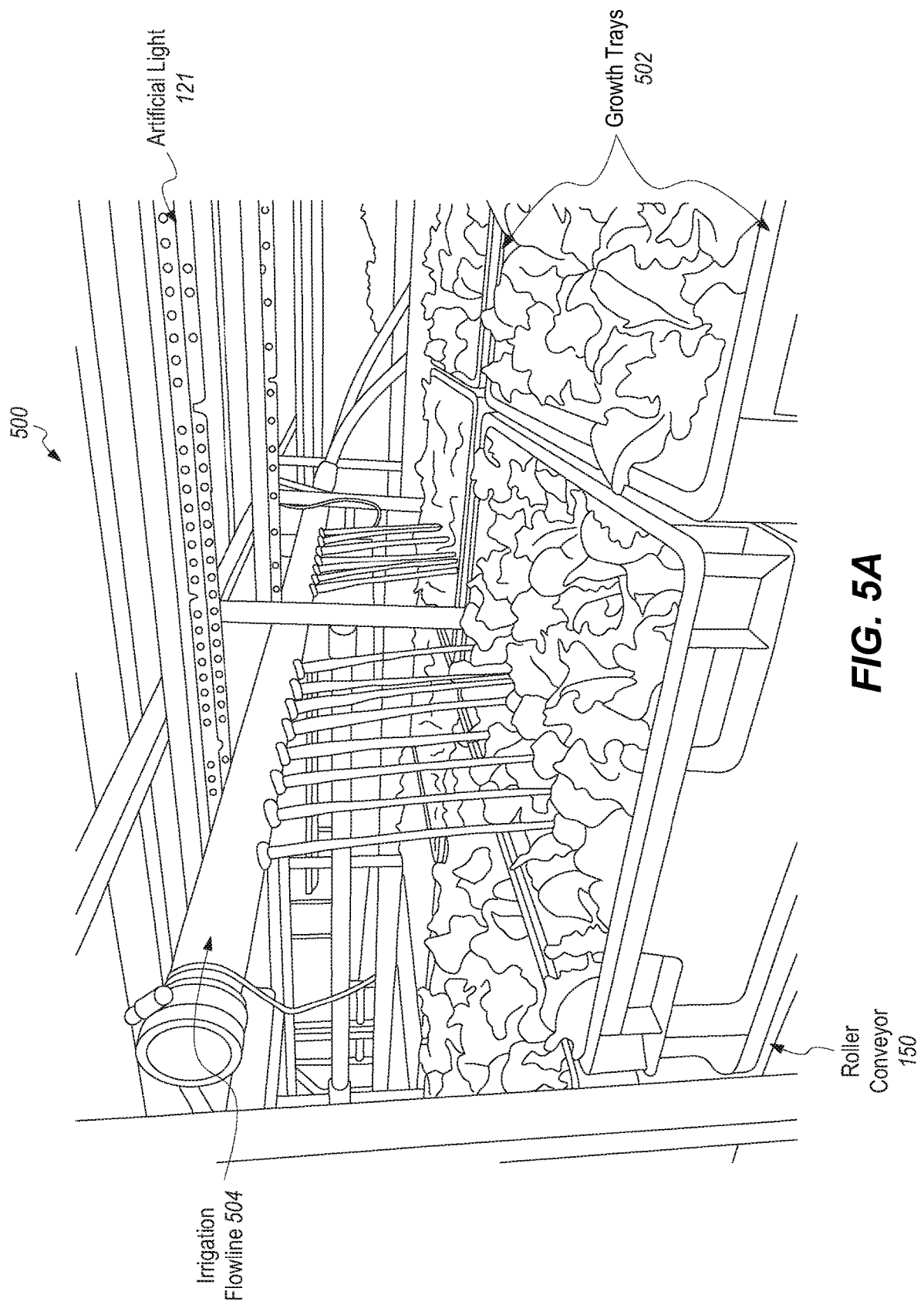
FIG. 5A, FIG. 5B, and FIG. 5C illustrate example irrigation structures for the vertical farming apparatus with which one embodiment could be implemented.
Figure 5B:
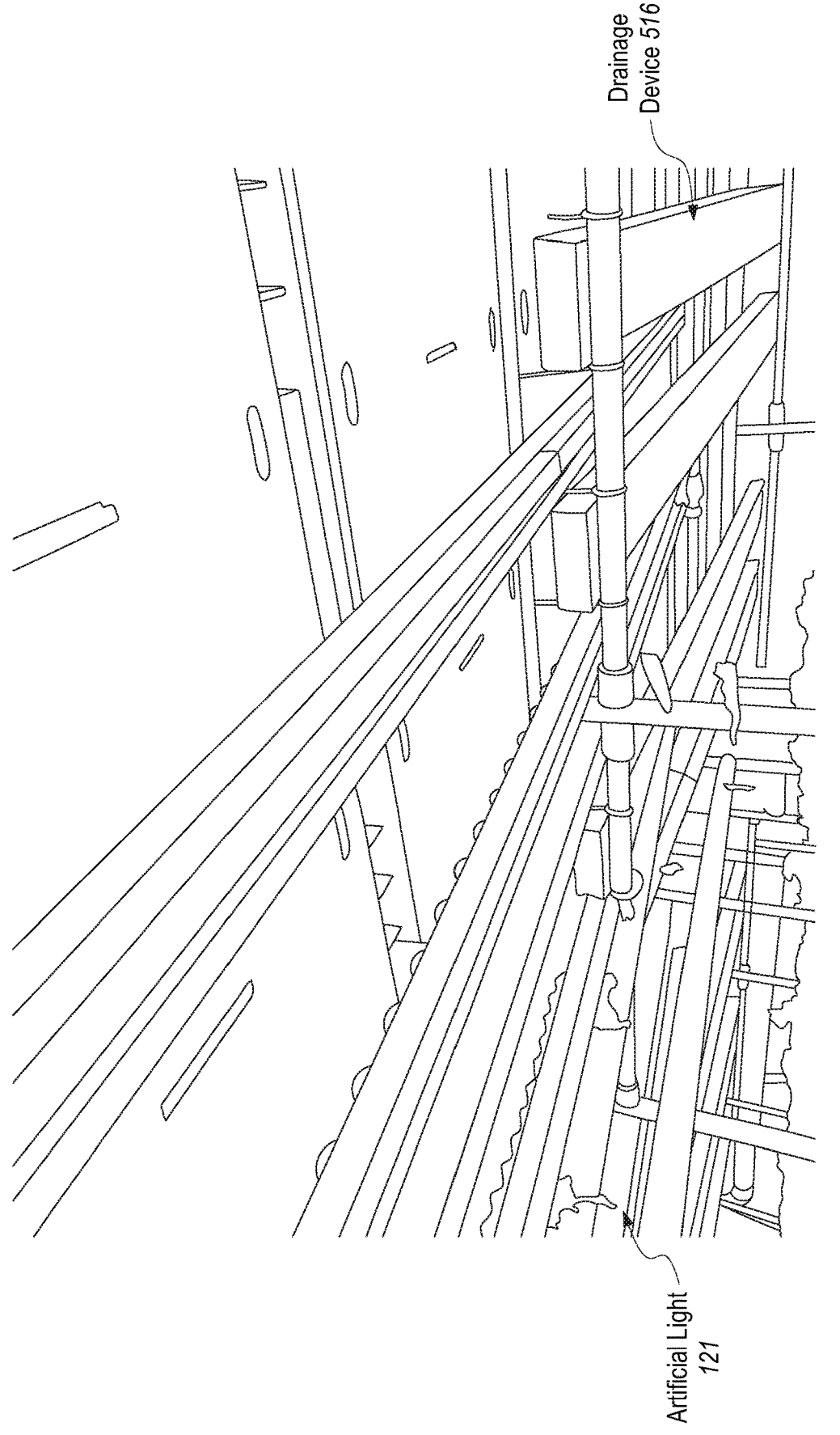
Figure 5C:
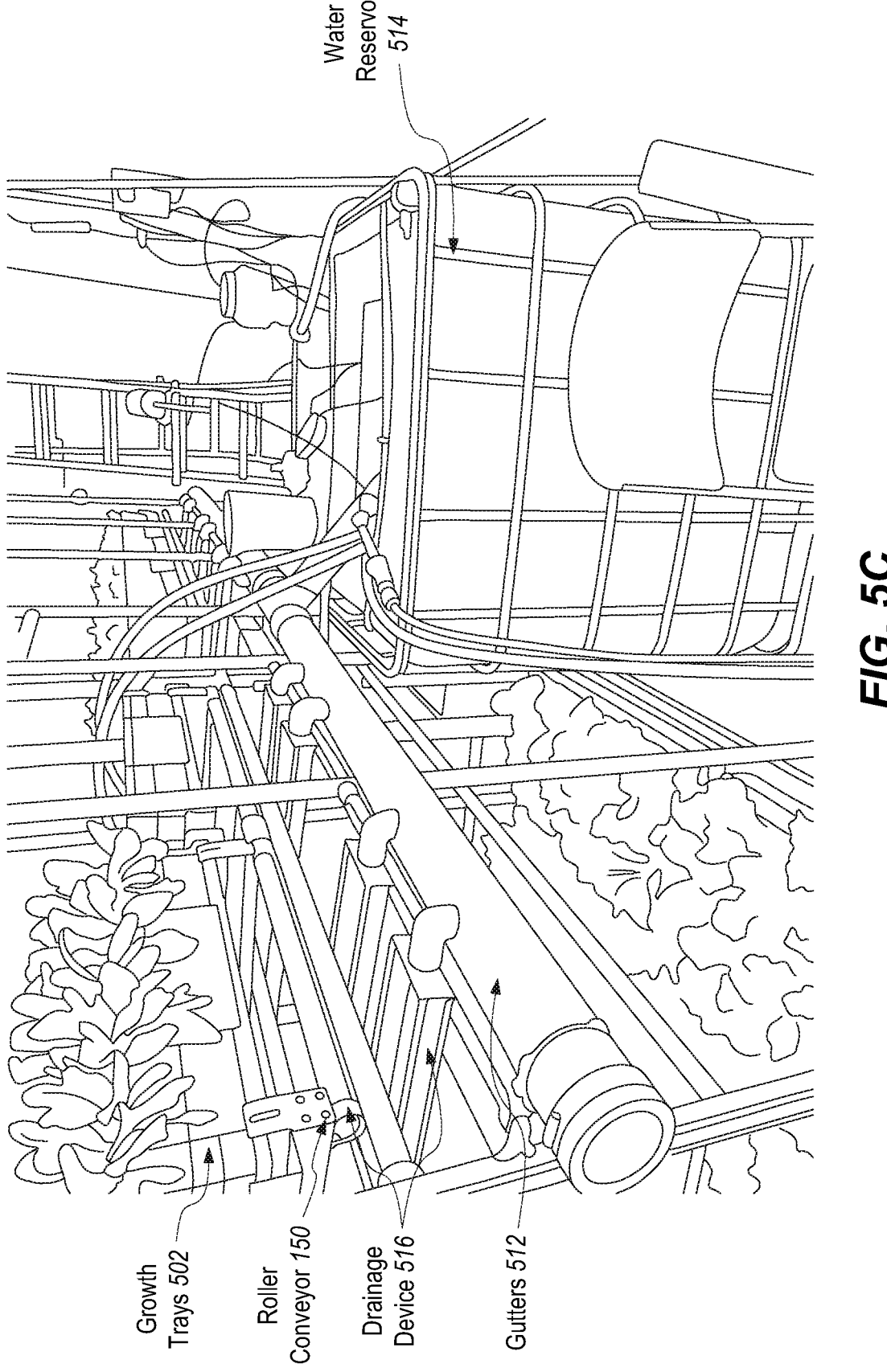

FIG. 5A, FIG. 5B, and FIG. 5C illustrate examples of irrigation structures 500 for the vertical farming apparatus. A conveyor segment, such as the roller conveyor 150, may move one or more growth trays 502 in the first direction through the irrigation section of the multi-level farming structure. FIG. 5A shows that one or more growth trays 502 may be watered by an irrigation flow line 504 at an irrigation station 142 when one or more growth trays 502 move on the roller conveyor 150 from left to right. The irrigation flow line 504 may include an irrigation component configured to apply water to one or more growth trays 502 at a particular location, such as the irrigation station 142, that all plants in the growth trays move through. FIG. 5B shows that one or more growth trays 502 may be illuminated by one or more artificial lights 121 at another location that all plants in the growth trays move through. In particular, drainage device 516 may drain excess water through one or more drain openings in one or more growth trays into one or more gutters. In particular, one or more growth trays 502 may arrive at end station 159 of the roller conveyor 150 and transfer to irrigation station 142. Alternatively, irrigation station 142 may comprise all of the first station 140 such that all the crops on the first station 140 are watered at once. The irrigation flow line 504 is configured to be disposed vertically above the roller conveyor 150 and to extend longitudinally in a second direction substantially perpendicular to the first direction. In particular, the irrigation flow line 504 includes one or more apertures formed therein that facilitate fluid flowing out of the irrigation flow line 504 onto the one or more growth trays 502 being moved through the irrigation section. The one or more apertures span multiple points along a length of the irrigation flow line 504.

In some embodiments, the irrigation flow line 504 is configured to have multiple holes formed therein at various locations along its length to water plants in the one or more growth trays 502 moving on the roller conveyor 150. For example, the irrigation flow line 504 comprises a plurality of 1.5-inch (3.75 cm) diameter PVC water pipes with long slit holes drilled at various locations to water the plants in the growth trays moving on the roller conveyor 150. As a result, the multiple holes of the irrigation flow line 504 may generate a curtain of water so the plants and the substrate in one or more growth trays 502 are evenly exposed to water. For example, the irrigation flow line 504 is configured to selectively apply water to each of the one or more growth trays 502 at a flow rate higher than the drainage rate. One or more growth trays 502 may be paused on the roller conveyor 150 under the irrigation flow line at the irrigation station 142 to receive about 5 gallons of water within a predetermined time period, such as about 30 seconds. Thus, the irrigation flow line 504 may output water at a flow rate between approximately 400 GPH and 800 GPH.

In some embodiment, the irrigation flow line 504 is configured to generate a drainage rate is about 60 GPH to avoid overwatering the plants in one or more growth trays 502. For example, each of the one or more growth trays 502 has a rectangle shape of 24 inches in length, 15 inches in width, and 5 inches in height with a volume of about 0.72 cubic feet or about 5.4 gallons. In particular, each of the one or more growth trays 502 comprises one or more drain openings having an elongated shape. The drain openings are elongated slits extending in a direction parallel to the first direction in which one or more growth trays 502 are moved along the roller conveyor 150. Each of the one or more growth trays 502 comprises two elongated drain openings located equidistant from the center of the growth tray. The drain openings are elongated slits extending in a direction parallel to the first direction in which the growth trays are moved along the roller conveyor 150. The two slit-shaped drain holes allow using a coarse growing substrate without clogging the drain holes and losing substrate through the drain holes. When the growth tray arrives at irrigation station 142, the irrigation flow line 504 may apply about 5 gallons of water in 30 seconds at a flow rate of about 600 GPH. The growth tray may be fully drained after about 5 minutes through the two slit-shaped drain holes at a drainage rate of about 60 GPH, which allows the water to fully saturate the roots of the plants in the substrate of the growth tray to completely refresh nutrient profile of the substrate.

In some embodiments, the irrigation flow line 504 is configured to maintain a balance of the flow rate and the drainage rate associated with the water flowing in and out of the one or more growth trays 502. FIG. 5C shows one or more gutters 512, which enable the one or more growth trays to drain at a plurality of locations after irrigation. One or more gutters 512 may be disposed under the roller conveyor 150 and in a position to catch water draining from the one or more drain openings in the one or more growth trays 502. The draining gutters may include a main drain line that leads back to a water reservoir 514. The water reservoir 514 may supply water to the irrigation flow line 504. In particular, the water reservoir 514 may be coupled to one or more gutters 512 to recirculate water collected in one or more gutters 512 to the water reservoir 514 for reuse via one or more drain lines. Likewise, the irrigation flow line 504 is coupled to a drainage device 516 which recaptures excess of the water traveling out of one or more growth trays 502. In particular, drainage device 516 may drain excess water through one or more drain openings in one or more growth trays 502 into one or more gutters 512.

In some embodiments, the ratio of the flow rate and the drainage rate may determine a flood height within one or more growth trays 502. The irrigation flow line 504 is configured to control the ratio of the flow rate and the drainage rate to ensure the flood height is below a target maximum flood height for one or more growth trays 502. For example, the irrigation flow line 504 may control the ratio of the flow rate and the drainage rate near a soil surface level for the substrate in one or more growth trays 502 to improve the establishment of transplants in the one or more growth trays 502 entering the multi-level farming structure. As another example, when the drainage rate is far below 60 GPH, possibly due to a clogged water pipe, one or more growth trays 502 still have enough time, such as 24 hours, to drain the water inside before the next irrigation.

In some embodiments, the multi-level farming structure may include a conveying means for conveying growth trays through a plurality of stations, an irrigation means for applying water to the growth trays, and a loading means for loading growth trays onto the conveying means. Each station is located at a different vertical level within the multi-level farming apparatus. The irrigation means is located at one of the plurality of stations through which the growth trays are moved by the conveying means. The loading means is located at the same station as the irrigation means. In particular, the irrigation means comprises an irrigation flow line disposed vertically above the conveying means and extending in a direction substantially perpendicular to the direction of movement of growth trays via the conveying means, wherein the irrigation flow line has one or more apertures formed therein to dispense water. Thus, the irrigation means is the only irrigation means within the multi-level farming structure or the sole irrigation means of the multi-level farming structure. The plurality of stations comprises at least one station for the simulation of the night (a "night simulation station"), and at least one station for the simulation of daylight or daytime (a "daylight simulation station"). The irrigation means is located at a first daylight simulation station following, in the direction of the conveying means, a night simulation station. For example, the multi-level farming structure may include eight levels, with night on the lower two levels and light on the top six levels. The irrigation flow line 504 is configured to be positioned at the third level where the plants in one or more growth trays 502 receive light for the first time during a 24-hour cycle throughout the eight levels of the multi-level farming structure. As another example, the roller conveyor 150 may be configured to move the one or more growth trays 502 vertically by zig zagging up a plurality of levels then using a counter-weighted drop to go from a top level to a bottom level. Likewise, the roller conveyor 150 may be configured to use an electric lift to move the one or more growth trays 502 from a bottom level to a top level and use gravity to move the one or more growth trays 502 slowly through levels towards the bottom level. Likewise, the roller conveyor 150 may be configured to use a plurality of small electric lifts allowing the one or more growth trays 502 to move up one level at a time from a bottom level to a top level then use gravity to drop the one or more growth trays 502 from the top level to the bottom level. Such an irrigation and illumination design helps to limit plant pathogens that thrive in wet, dark environments. In particular, the third level is also where new growth trays enter the vertical growing system, so they receive water right away or soon upon entering the vertical growing system. As another example, the irrigation means may include additional irrigation methods, such as sub-irrigation, based on crop type and age. In particular, a section of the roller conveyor 150 may have a few feet that dips down to be partially submerged in a flooded trough. Each growth tray 502 may temporarily move through this section to receive irrigation from the bottom.

Figure 6:
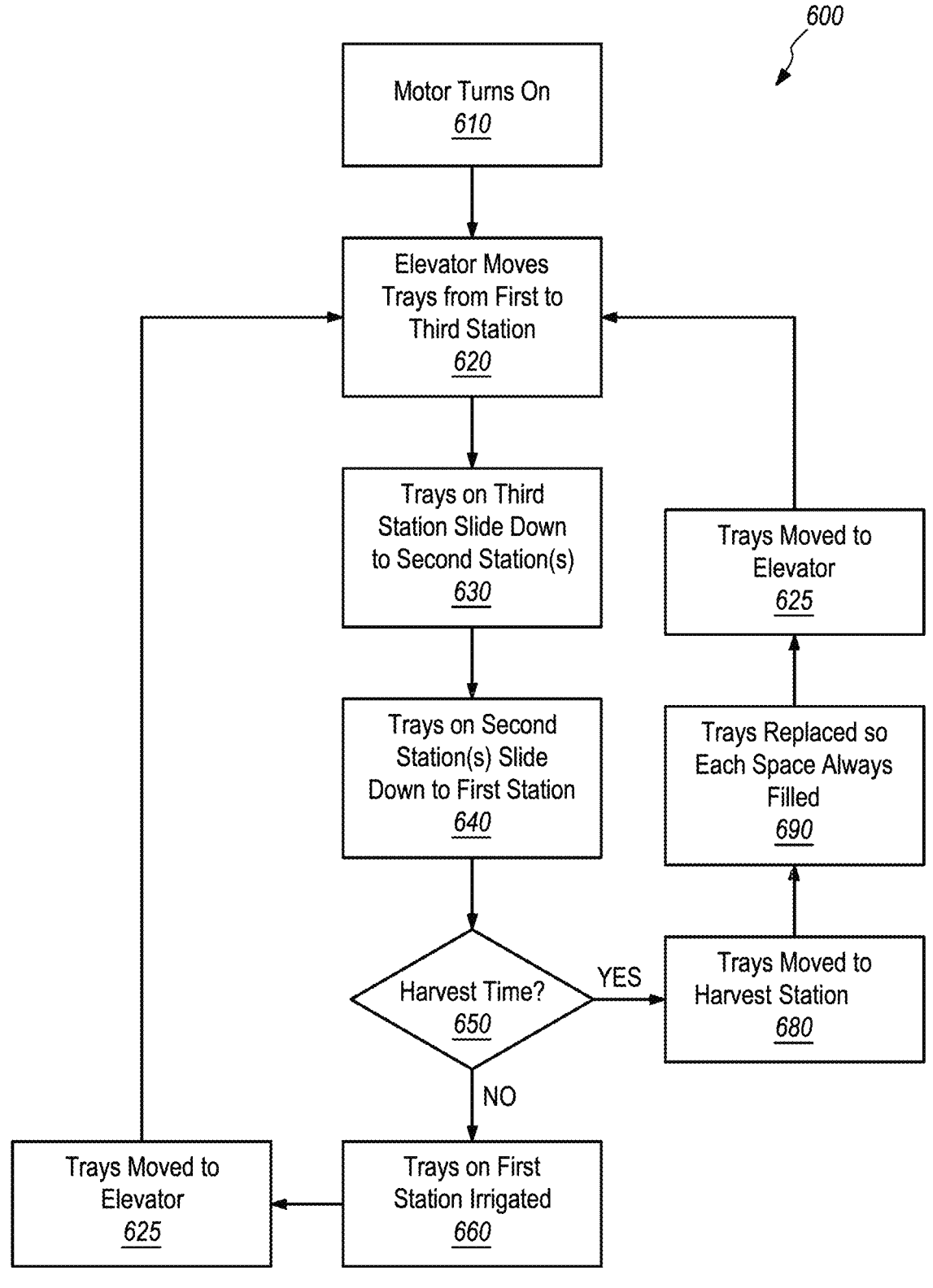
FIG. 6 illustrates an example process for moving growth trays through the different levels of the apparatus of any of FIG. 1, FIG. 2, FIG. 3, and FIG. 4.

FIG. 6 illustrates an example process for moving growth trays through the different levels of the apparatus of any of FIG. 1, FIG. 2, FIG. 3, and FIG. 4.

In one embodiment, a motor controlling the elevator drives all vertical movement of growth trays. A growth tray reaching the top of the elevator may be driven laterally into an upper station via a horizontally mounted hydraulic or pneumatic jack, a jackscrew driven by the same motor or a separate motor, or a pneumatic actuator. Thereafter, the force of gravity may cause growth trays to move down the conveyor to a subsequent lower station.

The motor may be controlled by a computing device. The same computer that controls the elevator may control the artificial lights, the irrigation system, the harvester, and, in some embodiments, the roller conveyor directly, under coordinated stored program control. In some embodiments, there is one program that can be set to move the trays, water the crops within the trays, turn the lights on and off, and harvest the crops automatically. These different elements may use different motors and switches. The controls for the artificial lights and irrigation system may have set timers for turning the lights and the water on and off automatically, or this may be done manually with or without a schedule.

Referring again to FIG. 6, in an embodiment, a process for moving trays 600 begins when, at step 610, the motor starts operating. In some embodiments, the motor is started manually, according to intervals. In others, motor operation is controlled according to preset intervals which have been programmed using the computer system. The sliding of the growth trays and static positioning of irrigation and harvesting stations allows for a more frequent rotation than is feasible for other large-scale vertical farming systems.

Time intervals may vary based on the type of crop or total number of stations. In one embodiment, time intervals may be staggered off of a 24-hour cycle so as to allow workers to work with a different set of plants on different days, all while maintaining regular work hours. In some embodiments, the growing containers complete a cycle through the vertical farming apparatus every 18-30 hours as opposed to a regular 24-hour cycle. For example, an apparatus with three stations may run on six-hour intervals, such that the growth trays on the first station from 6 A.M. to noon one day may be at the third station from 6 A.M. to noon the next day and the second station from 6 A.M. to noon the third day in a cycle. In another example, an apparatus with five stations may run on four-hour intervals, such that each set of growth trays will be in a position to be easily accessed by staff without the use of stools, scissor lifts, or ladders at the same time of day every five days.

In an embodiment, at step 620, when the motor is turned on, the elevator moves one or more growth trays from the first station to the third station. In an embodiment, the cycle time is maintained and/or adjusted by controlling the vertical lift motor speed and on-time frequency.

At step 630, growth trays on the third station move down to the vertically adjacent second station by the force of gravity. The growth trays on the second station move to the next vertically adjacent second stations until they arrive at the first station, at step 640, by continuing to slide down by the force of gravity.

At the first station, an individual can manually change the path of the growth trays for harvesting or the stored program control can be set to determine whether it is harvest time for the crops and automatically change the path, at step 650.

If plant material in a growth tray has reached a harvest point, the trays are manually or automatically diverted to a harvest station, at step 680. In some embodiments, this harvest station is a place where staff has easy access to harvesting crops and in others this harvest station consists of a mechanical harvesting device. Subsequently, any trays taken off the main track of the roller conveyor to the harvest station may be replaced on the main conveyor so each space is always filled, at step 690. In embodiments where the harvesting is done at the first station, there is the added benefit of harvesting the crops after a simulated night cycle while the crops are at peak flavor and peak moisture retention for the greatest fresh weight. If it is not harvest time, the trays are moved through an irrigation station at step 660 and back to the elevator at step 625 to start the cycle again as indicated by step 620.

Alternatively, the irrigation may happen before the crops are moved to the harvest station. In embodiments where the harvesting station is at the third rather than the first station, the decision for harvest time may happen after the step of lifting the growth trays in the elevator. In embodiments where there are multiple irrigation stations, the irrigation step will happen more frequently between multiple different steps.

In some embodiments, plants experience a 10-15-degree temperature difference between the top of the system and the bottom of the system. A temperature differential may improve the control of the metabolism of plants. Temperature stratification between the different levels, aided by heat generation from the lights causing an upward airflow, may help further imitate a similar cycle to what plants would experience outside. Furthermore, plant circadian rhythms are influenced by environmental cues, including both light and temperature. These signal to plants to extend or shorten the internal circadian rhythm to match their flow through the vertical growing cycle.

In an example embodiment, the steps of the method are programmed into a computer attached to the apparatus. This computer may be attached to a control panel, allowing for input on one end and an output comprising electrical connections to motors that drive the system on the other.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
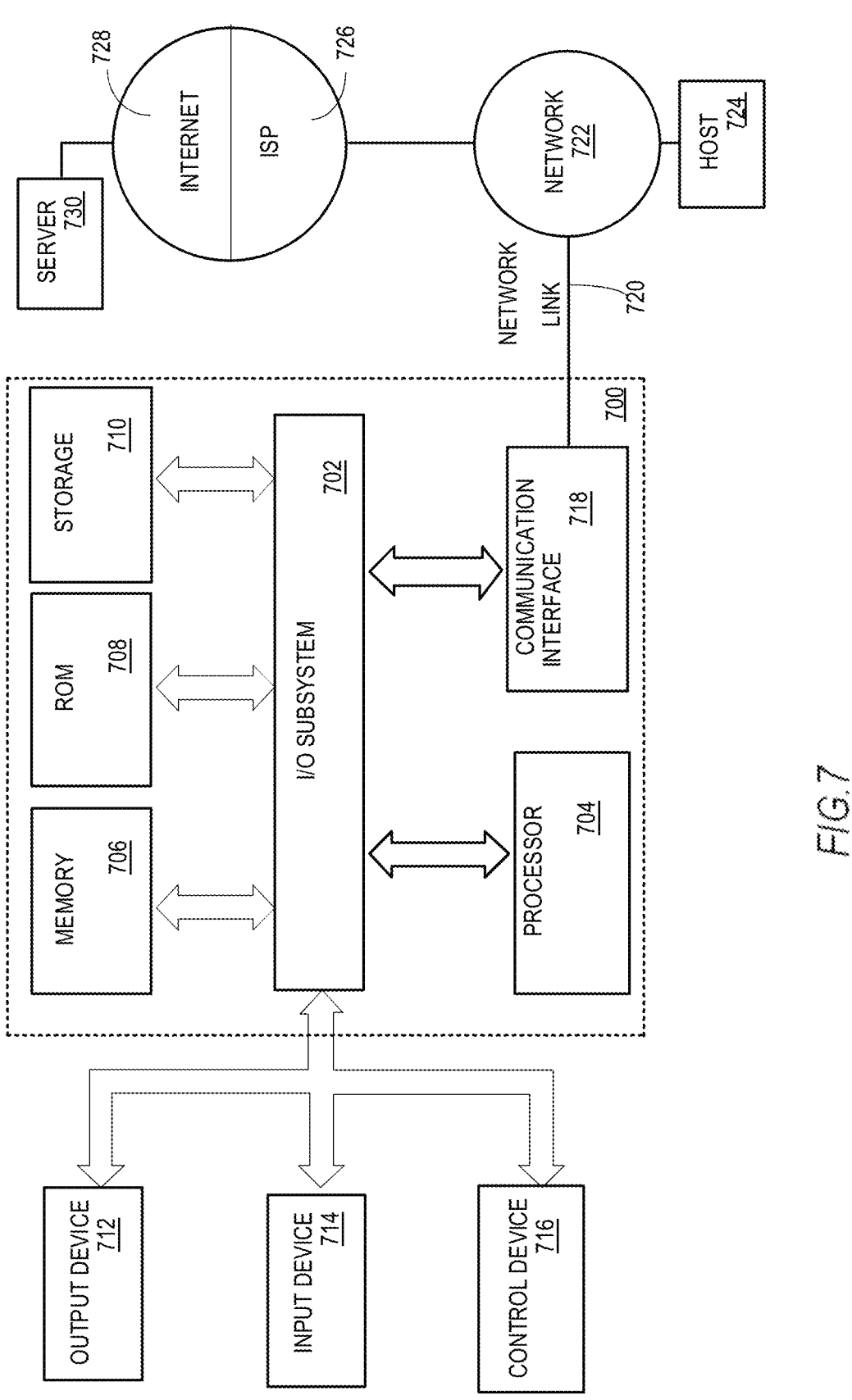
FIG. 7 illustrates a computer system with which one embodiment could be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller, and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during the execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read-only memory (ROM) 708 or other static storage devices coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disks such as CD-ROM or DVD- ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708, or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system, or other data storage.

Computer system 700 may be coupled via I/O subsystem 702 to at least one output device 712. In one embodiment, output device 712 is a digital computer display. Examples of a display that may be used in various embodiments include a touchscreen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections, or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on output device 712, which may be a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an Internet of Things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders, and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host computer 724 or server computer 730.

Computer system 700 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 702. Transmission media can also take the form of acoustic or light waves, such as those generated during radio-wave and infrared data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to the bus. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a worldwide packet data communication network represented as Internet 728. A server computer 730 may be coupled to Internet 728. Server computer 730 broadly represents any computer, data center, virtual machine, or virtual computing instance with or without a hypervisor or computer executing a containerized program system such as DOCKER or KUBERNETES. Server computer 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server computer 730 may form elements of a distributed computing system that includes other computers, a processing cluster, server farm or other organization of computers that cooperate to perform tasks or execute applications or services. Server computer 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 730 may comprise a web application server that hosts a presentation layer, application layer, and data storage layer such as a relational database system using a structured query language (SQL) or no SQL, an object store, a graph database, a flat file system or other data storage.

Computer system 700 can send messages and receive data and instructions, including program code, through the network(s), network link 720, and communication interface 718. In the Internet example, server computer 730 might transmit a requested code for an application program through Internet 728, ISP 726, local network 722, and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system for irrigating growth trays in a multi-level farming structure, the system comprising:

a transport elevator that selectively elevates one or more of the growth trays from a first station at a lowest vertical level, through one or more second stations at intermediate higher vertical levels, to a third station at a highest vertical level;

a roller conveyor that receives the one or more growth trays from the third station and conveys the one or more growth trays to the first station; wherein the roller conveyor comprises a conveyor segment to move one or more growth trays in a first direction through an irrigation section of the multi-level farming structure; and an irrigation flow line vertically above the conveyor segment and extending longitudinally in a second direction substantially perpendicular to the first direction, wherein the irrigation flow line has one or more apertures formed therein that facilitate fluid flowing out of the irrigation flow line onto the one or more growth trays being moved through the irrigation section, the one or more apertures spanning multiple points along a length of the irrigation flow line.

2. The system of claim 1, wherein each growth tray among the one or more growth trays comprises one or more drain openings having an elongated shape.

3. The system of claim 2, wherein the one or more drain openings are elongated slits extending in a direction parallel to the first direction in which the growth trays are moved along the conveyor segment.

4. The system of claim 2, wherein each particular growth tray among the one or more growth trays comprises two elongated drain openings located equidistant from a center of the particular growth tray.

5. The system of claim 2, further comprising one or more gutters disposed under the conveyor segment and in a position to catch water draining from the one or more drain openings in the one or more growth trays.

6. The system of claim 5, further comprising:

a water reservoir to supply water to the irrigation flow line; and one or more drain lines coupled to the one or more gutters to recirculate water caught in the one or more gutters to the water reservoir.

7. The system of claim 1, wherein the irrigation flow line is coupled to a drainage device that recaptures excess water traveling out of the growth trays.

8. A multi-level farming apparatus, comprising:

elevating means for selectively elevating the growth trays from a first station at a lowest vertical level, through one or more second stations at intermediate higher vertical levels, to a third station at a highest vertical level;

conveying means for receiving the growth trays from the third station and for conveying growth trays through a plurality of stations to the first station, each station located at a different vertical level within the multi-level farming apparatus; and an irrigation means for applying water to the growth trays, the irrigation means being located at one of the plurality of stations through which the growth trays are moved by the conveying means, and the irrigation means comprising an irrigation flow line disposed vertically above the conveying means and extending in a direction substantially perpendicular to the direction of movement of growth trays via the conveying means, wherein the irrigation flow line has one or more apertures formed therein to dispense water.

9. The multi-level farming apparatus of claim 8, wherein the irrigation means is a sole irrigation means of the multi-level farming apparatus.

10. The multi-level farming apparatus of claim 8, wherein the plurality of stations comprise at least one night simulation station and at least one daylight simulation station, wherein the irrigation means is located at a first daylight simulation station following, in the direction of the conveying means, a night simulation station.

11. The multi-level farming apparatus of claim 10, wherein the plurality of stations comprise six daylight simulation stations and two night simulation stations.

12. The multi-level farming apparatus of claim 8, further comprising a loading means for loading growth trays onto the conveying means, the loading means being located at a same station as the irrigation means.

13. A method of irrigating growth trays in a multi-level farming structure, the method comprising:

selectively elevating one or more of the growth trays from a first station at a lowest vertical level, through one or more second stations at intermediate higher vertical levels, to a third station at a highest vertical level;

receiving, using a roller conveyor, one or more of the growth trays from the third station and conveying the one or more growth trays to the first station;

moving one or more growth trays in a first direction through an irrigation section of the multi-level farming structure via a conveyor segment of the roller conveyor; and applying water to the growth trays in the irrigation section via an irrigation flow line disposed vertically above the conveyor segment and extending longitudinally in a second direction substantially perpendicular to the first direction, wherein the irrigation flow line outputs water through one or more apertures spanning multiple points along a length of the irrigation flow line.

14. The method of claim 13, further comprising pausing each particular growth tray on the conveyor segment under the irrigation flow line while applying water to the particular growth tray.

15. The method of claim 13, further comprising moving each particular growth tray continuously on the conveyor segment under the irrigation flow line while applying water to the particular growth tray.

16. The method of claim 13, wherein the irrigation flow line outputs water at a flow rate between approximately 400 gallons per hour and 800 gallons per hour.

17. The method of claim 13, wherein the irrigation flow line outputs water at a flow rate that is higher than a drainage rate for the growth trays.

18. The method of claim 13, further comprising draining excess water through one or more drain openings in the growth trays into one or more gutters.

19. The method of claim 18, further comprising recirculating the excess water collected by the one or more gutters for reuse in the irrigation section.

\* \* \* \* \*